3,526,975
EDUCATIONAL GAME DEVICE
Stanley H. Reeves, 2804 Oakman Blvd.,
Detroit, Mich. 48238
Filed Mar. 19, 1969, Ser. No. 808,455
Int. Cl. G09b 11/04
U.S. Cl. 35—37                              6 Claims

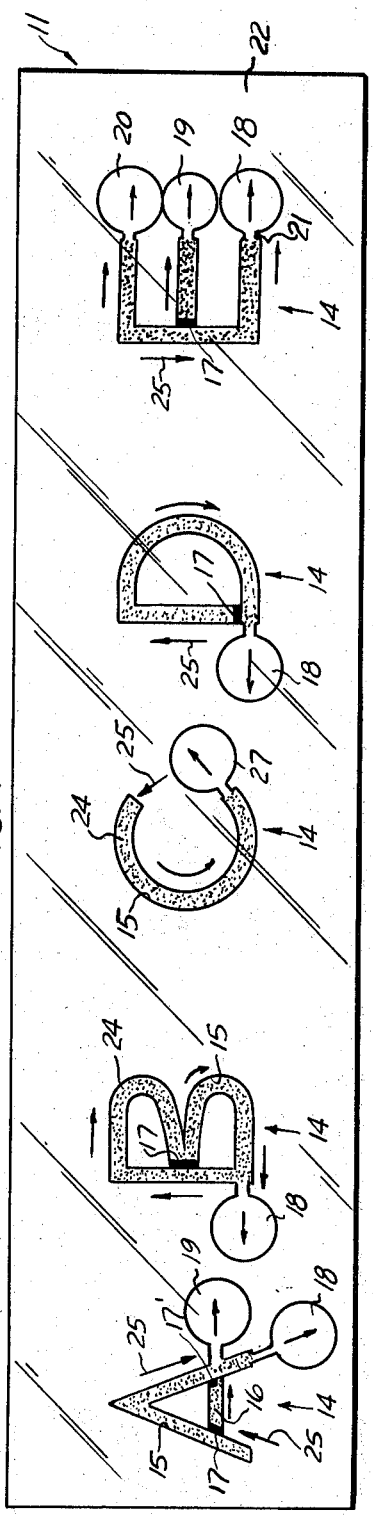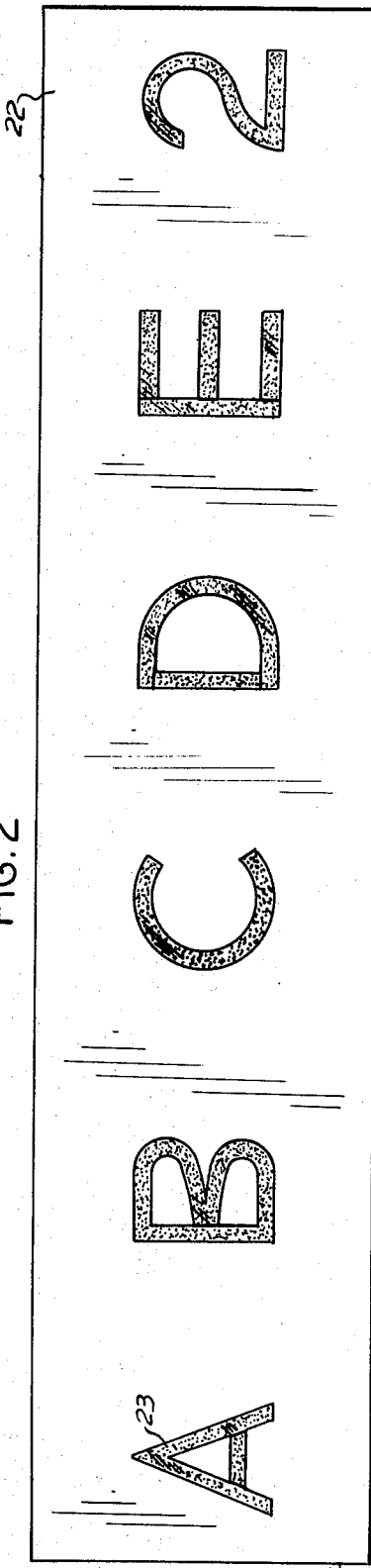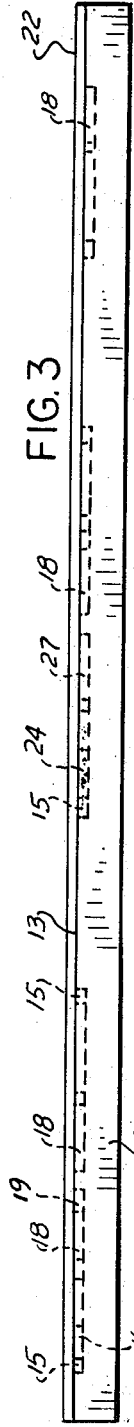
Sept. 8, 1970 S. H. REEVES 3,526,975
EDUCATIONAL GAME DEVICE
Filed March 19, 1969
INVENTOR
STANLEY H. REEVES
BY Cullen, Sloman, & Cantor
ATTORNEYS United States Patent Office 3,526,975
Patented Sept. 8, 1970

ABSTRACT OF THE DISCLOSURE

An educational device for learning the correct stroke in printing or writing letters of the alphabet and numbers which consists of an elongated base having grooved into its top surface a series of such letters or numbers, there being spread throughout said grooves magnetically charged particles, and one or more storage chambers for the charged particles formed in said top surface at locations corresponding to the ends of the normal strokes for the individual letter or number, and a transparent cover snugly overlying said top surface together with a magnetic stylus for manual tracing over and along said grooves respectively for collecting and transporting said charged particles into said storage chambers.

BACKGROUND OF THE INVENTION

Heretofore, with pre-school children, adult illiterates, the perceptually handicapped and others, the matter of printing or writing the letters of the alphabet and numbers is often difficult to learn except by practice and continuous supervision.

Various efforts and guides have heretofore been provided to assist in the learning of the correct strokes for forming such letters and numbers and for learning the correct strokes for forming said letters and numbers.

BRIEF DESCRIPTION OF THE INVENTION

It is an object of the present invention to provide an educational and entertaining game for learning the correct strokes required in printing or writing the letters of the alphabet or numbers by utilizing a magnetic stylus to collect and transport magnetically charged particles such as iron filings through a maze which corresponds to the strokes used to write or print the letter or number.

It is another object to provide a game device by which formed within a support surface are a series or sets of grooves arranged to define the letters of the alphabet or numbers; the support being covered and enclosed so as to retain within the grooves a quantity of magnetically charged particles such as iron filings which upon application of a magnetic stylus executing the correct strokes required for forming said letters or numbers, the said particles will be collected and transported throughout the grooves into an independent storage trap or recess.

These and other objects will be seen from the following specification and claims in conjunction with the accompanying drawing in which:

FIG. 1 is a plan view of one form of the present educational device.

FIG. 2 is a plan view of another form thereof.

FIG. 3 is a side elevational view of the device shown in FIG. 1.

FIG. 4 is a perspective view of a magnetic stylus.

Referring to the drawings, the educational device 11, FIG. 1 or the modification, FIG. 2 consists of an elongated base 12 which may be constructed of a plastic material and which includes a flat top surface 13.

A series of sets 14 of outwardly opening grooves are formed within said top surface to thus define a plurality of spaced letters or numbers in the nature of individual mazes.

Making up the respective sets are the grooves 15 and 16 such as shown with respect to the letter A of FIG. 1.

At one intersection of the grooves 15 and 16 there is provided thereacross the partition 17. A partial partition 17' is also formed at the other end of groove 16 for the purpose of preventing incorrect direction of strokes in forming a particular letter.

Adjacent the ends of the grooves forming a particular letter and at what would be regarded as the end of a correct stroke in forming such letter, printing or writing the same, there are formed within said top surface one or more trap recesses 18 and 19 such as shown in FIG. 1 with respect to the letter A, but one such recess being shown with respect to the letter B as designated at 18.

This is because in forming the letter A, two strokes are required to correctly print or write such letter whereas with the letter B, one continuous stroke is all that is required.

In the illustration of the letter E, FIG. 1, three actual strokes are required to correctly form this letter and accordingly there is an additional trap recess 20 provided within the top surface of the base.

The respective trap recesses 18, 19 and 20 are in communication with that portion of the corresponding letter defining groove 15 or 16 which corresponds to the end of a particular stroke; said communication being designated by the numeral 21 indicating a pathway into the corresponding trap recess 18, 19 or 20.

A cover 22 extends over the entire top surface 13 of said base and is suitably secured thereto so as to provide a top closure for the respective outwardly opening recesses 15, 16 and the trap recesses 18, 19 and 20.

In FIG. 1 the entire cover 22 is formed of a transparent plastic so as to reveal all portions of the top surface 13 including the letter grooves 15 and 16 as well as the trap recesses.

In FIG. 2 a modification of the educational device provides transparent portions 23 only over that portion of the cover which corresponds to a letter or number defining grooves in the base and does not permit a view of the location of the respective recess traps. Thus, the device of FIG. 2 may be used for self-testing once a correct direction of stroke has been learned.

Filling the respective grooves 15 and 16, which define the respective sets of grooves or letters or numbers are a plurality of substantially uniformly distributed magnetically charged particles 24, such as iron filings, which are sufficiently opaque so as to register within the grooves 15 and 16 to visibly define the individual letters or numbers.

Suitable indicia 25 is also provided in the form of arrows for designating the correct direction of stroke to be used when the stylus 26, FIG. 4, is manually transported over and along said grooves 15 and 16 in stroke directions and in length of strokes which are correct for the particular letter.

In so doing, the stylus being magnetized, collects and transports the respective iron particles or filings 24 and moves the same through the communicating passage 21 into the respective traps 18, 19 or 20 or all of them as the case may be.

The strength of the magnetic stylus employed may be modified or reduced so that additional strokes would be required to remove all the particles from a particular maze. This would require or force the student to practice his strokes before continuing to the next letter or number.

In operation of the present game device, once the practice has been carried out with respect to all the letters and it is desired to repeat the process, the base support can be inverted or moved in such a manner that the iron filings 24 may be redistributed with substantial degree of uniformity throughout the respective grooves 15 and 16 which make up the individual letters or numbers.

The areas in FIG. 1 which designate the visible trap recesses 18 or 19 are designated as windows 27.

In the case of FIG. 1, the cover 22 is entirely transparent whereas, in FIG. 2, the transparent portions at 23 are limited to the outline of the respective letters.

The partition 17 in the A designation, FIG. 1, including the partial partition 17' extending substantially across intersecting grooves or partially thereacross is for the purpose of making it impossible for the student to transport the particles in the wrong direction.

The indicia 25 of FIG. 1 indicating the direction of correct stroke for forming a particular letter or number, are omitted from the more advanced apparatus shown in FIG. 2.

The respective trap recesses 18, 19 and 20 are located at the end of and adjacent and in communication with that end portion of the corresponding groove matching the correct stroke in forming the letter or number.

Among the intended applications for the present device are teaching pre-school children to write letters or numbers, aiding adult illiterates to write, training the perceptually handicapped. It is a physiological fact that slow readers are often poor writers because of problems in co-ordinating their eyes and/or hands.

There are machines in use today which are used to train the eye to follow letters and words in a coordinated manner and thereby make it possible for "slow readers" to improve their reading. In using the present instruction device, a student will train both the hand and the eye.

While a limited number of sets 14 of grooves defining corresponding letters or numbers are shown, it is contemplated that the teaching device may include more letters, more rows of letters or all the letters or that there may be separate devices employed so that all the letters in the alphabet can be taught and including, for example, all of the digits between 1 and 10.

The present device though particularly directed for the teaching and learning of correct strokes for printing letters and numbers, could be employed, furthermore, for teaching drawing of simple and basic designs as within the scope of the present educational device.

METHOD

The present method of learning the correct strokes in printing or writing the letters of the alphabet or numbers consists of the following steps:

(1) Providing in a support a series of sets of letters or number defining grooves and also providing recesses at the ends of the group elements defining a complete letter forming stroke;

(2) Confining in said letter defining groups a quantity of iron particles; and (3) Manually transporting a magnetic stylus over said grooves in directions corresponding to the correct letter forming stroke, and collecting and transporting said filings outwardly of the ends of said grooves.

Having described my invention, reference should now be had to the following claims.

I claim:

1. In an educational and entertaining game device for learning the correct strokes required in printing or writing the letters of the alphabet and numbers comprising;

an elongated base having a flat top surface;

a series of longitudinally spaced sets of outwardly opening grooves formed in said top surface defining a plurality of letters or numbers in the form of individual mazes;

there being formed in said top surface adjacent each set of grooves at least one outwardly opening trap recess communicating with a groove at the end of a normal writing stroke;

magnetically charged particles distributed throughout the grooves forming each letter or number;

a flat cover snugly overlying said top surface closing off said grooves and traps;

there being transparent portions in said cover of a shape corresponding to and overlying said letters or number defining grooves;

and a magnetic stylus adapted for guided manual strokes over and along said grooves in directions corresponding to the correct strokes for printing or writing said letters or numbers so that the particles are collected and transported by the stylus into the respective traps successively.

2. In the educational device of claim 1, said cover being a plastic material, said transparent portions extending throughout said cover.

3. In the educational device of claim 1, said particles being iron filings.

4. In the educational device of claim 1, and in those groups of letter defining grooves requiring more than one continuous stroke, a transverse partition extending substantially across the line of intersection of said grooves respectively to prevent an incorrect stroke in the wrong direction.

5. In the educational device of claim 1, indicia applied to the cover adjacent said grooves to indicate the correct direction of stroke.

6. The method of learning the correct strokes in printing or writing the letters of the alphabet and numbers which consist of the following steps:

(1) providing in a support a series of sets of letter or number defining grooves with trap recesses at the ends of the grooves defining complete letter forming strokes and providing a maze;

(2) confining in said letter defining grooves a quantity of iron particles; and (3) transporting a magnetic stylus over said grooves in the direction corresponding to the correct letter forming strokes and collecting and transporting said filings outwardly of the ends of said grooves.

References Cited

UNITED STATES PATENTS

| 2,589,601 | 3/1952 | Burnett | 35—66 |
| 3,063,164 | 11/1962 | Pellegrino et al. | 35—66 |
| 3,197,892 | 8/1965 | Hancy | 35—37 |
| 3,238,643 | 3/1966 | O'Connor | 35—36 |

WILLIAM H. GRIEB, Primary Examiner

U.S. Cl. X.R.

35—66